(12) United States Patent
Tsurutani et al.

(10) Patent No.: US 8,653,312 B2
(45) Date of Patent: *Feb. 18, 2014

(54) METHOD FOR PRODUCING WATER-INSOLUBLE LIQUEFIED FUEL OIL FROM BIOMASS

(75) Inventors: Kazushi Tsurutani, Toyota (JP); Tsutomu Sakai, Kyoto (JP); Mitsuru Kondo, Kyoto (JP)

(73) Assignee: Toyota Jidosha Kabushiki Kaisha, Aichi (JP)

( * ) Notice: Subject to any disclaimer, the term of this patent is extended or adjusted under 35 U.S.C. 154(b) by 861 days.

This patent is subject to a terminal disclaimer.

(21) Appl. No.: 12/794,386

(22) Filed: Jun. 4, 2010

(65) Prior Publication Data

US 2010/0312027 A1 Dec. 9, 2010

(30) Foreign Application Priority Data

Jun. 5, 2009 (JP) ................... 2009-136435
Jun. 5, 2009 (JP) ................... 2009-136438

(51) Int. Cl.
*C07C 1/00* (2006.01)

(52) U.S. Cl.
USPC ................... 585/242; 585/240; 44/605

(58) Field of Classification Search
USPC ................... 585/240, 242; 44/605, 606
See application file for complete search history.

(56) References Cited

U.S. PATENT DOCUMENTS

| | | | | |
|---|---|---|---|---|
| 4,052,292 A | | 10/1977 | Espenscheid et al. | |
| 4,145,188 A | * | 3/1979 | Espenscheid et al. | ........ 585/240 |
| 4,247,384 A | * | 1/1981 | Chen et al. | ..................... 208/430 |
| 4,266,083 A | * | 5/1981 | Huang | ........................... 585/240 |
| 4,451,351 A | * | 5/1984 | Porter et al. | .................. 208/415 |
| 4,618,736 A | * | 10/1986 | Benn et al. | ..................... 585/240 |
| 4,935,567 A | * | 6/1990 | Yokoyama et al. | ........... 585/240 |
| 5,336,819 A | * | 8/1994 | McAuliffe et al. | ........... 585/240 |
| 7,578,927 B2 | | 8/2009 | Marker et al. | |
| 8,288,600 B2 | * | 10/2012 | Bartek et al. | .................. 585/240 |
| 2007/0100162 A1 | * | 5/2007 | Petrus et al. | .................. 562/515 |
| 2008/0053870 A1 | | 3/2008 | Marker et al. | |
| 2008/0072478 A1 | * | 3/2008 | Cooper | ........................... 44/606 |
| 2008/0076945 A1 | | 3/2008 | Marker et al. | |
| 2010/0192457 A1 | | 8/2010 | Tsurutani et al. | |

FOREIGN PATENT DOCUMENTS

| | | |
|---|---|---|
| CN | 101113348 A | 1/2008 |
| JP | 60-262888 A | 12/1985 |
| JP | 61-066789 A | 4/1986 |
| JP | 61-073793 A | 4/1986 |
| JP | 61-115994 A | 6/1986 |

(Continued)

OTHER PUBLICATIONS

A.V. Bridgewater, et al. "Production of high grade fuels and chemicals from catalytic pyrolysis of biomass," Catalysis Today, 1996, pp. 285-295, vol. 29.

(Continued)

*Primary Examiner* — Nina Bhat
(74) *Attorney, Agent, or Firm* — Sughrue Mion, PLLC (57) ABSTRACT

Provided herein is a method for producing a water-insoluble liquefied fuel oil containing a hydrocarbon from biomass. The method includes converting an oxygen-containing compound in a liquefied fuel oil obtained after liquefaction to a hydrocarbon and converting a water-soluble organic substance contained in an aqueous phase to a hydrocarbon, thereby improving the yield of the water-insoluble liquefied fuel oil.

15 Claims, 2 Drawing Sheets

(56) References Cited

FOREIGN PATENT DOCUMENTS

| JP | 61-225280 61 | | 10/1986 |
|---|---|---|---|
| JP | 02102295 | A | 4/1990 |
| JP | 03-258731 | A | 11/1991 |
| JP | 4-75274 | B2 | 11/1992 |
| JP | 05-179253 | A | 7/1993 |
| JP | 09-029202 | A | 2/1997 |
| JP | 3755076 | A | 7/2001 |
| JP | 2005-288406 | A | 10/2005 |
| JP | 2005-296906 | A | 10/2005 |
| JP | 2006-063310 | A | 3/2006 |
| JP | 2009-046661 | A | 3/2009 |
| WO | 2004/037730 | A2 | 5/2004 |
| WO | 2008/039756 | A2 | 4/2008 |
| WO | 2009/000838 | A2 | 12/2008 |
| WO | 2009/014225 | A1 | 1/2009 |

OTHER PUBLICATIONS

Gang Wang et al.: "Direct liquefaction of sawdust under syngas", ScienceDirect, Fuel 86 (2007) 1587-1593.

Yun Yang et al.: "Production of Bio-Crude from Forestry Waste by Hydro-Liquefaction in Sub-/Super-Critical Methanol", Environmental and Energy Engineering, pp. 807-819, vol. 55, No. 3, Mar. 2009.

Hui Li et al.: "Liquefaction of rice straw in sub- and supercritical 1,4-dioxane-water mixture", Fuel Processing Technology 90 (2009), pp. 657-663.

Katsumi Hirano et al.: "Study on Direct Liquefaction of Wood Biomass", Journal of the Japan Institute of Energy, 83, pp. 770-775 (2004).

Yejian Qian et al.: "Structural analysis of bio-oils from sub- and supercritical water liquefaction of woody biomass", ScienceDirect, Energy 32 (2007), pp. 196-202.

Chunbao Xu et al.: "Production of Heavy Oils with High Caloric Values by Direct Liquefaction of Woody Biomass in Sub/Near-critical Water" (revised manuscript), Energy & Fuels 2008, 22, pp. 635-642.

David Wolf et al.: "Energy from biomass through direct liquefaction", Perspectives in Energy, 1994-1995, vol. 3, pp. 391-404.

M. M. Küçük: "Liquefaction of Biomass by Supercritical Gas Extraction", Energy Sources, 23:363-368, 2001.

Jun Yamazaki et al.: "Liquefaction of beech wood in various supercritical alcohols", The Japan Wood Research Society (2006) 52:527-532.

Non-Final Office Action issued on Dec. 15, 2011, in U.S. Appl. No. 12/670,208.

Final Office Action issued on Jul. 20, 2012, in U.S. Appl. No. 12/670,208.

Advisory Action issued on Nov. 23, 2012, in U.S. Appl. No. 12/670,208.

Non-Final Office Action issued on Feb. 25, 2013, in U.S. Appl. No. 12/670,208.

Final Office Action mailed on Sep. 26, 2013, in co-pending U.S. Appl. No. 12/670,208.

Advisory Action issued Dec. 30, 2013 in U.S. Appl. No. 12/670,208, filed Jan. 22, 2010.

* cited by examiner

METHOD FOR PRODUCING WATER-INSOLUBLE LIQUEFIED FUEL OIL FROM BIOMASS

BACKGROUND OF THE INVENTION

1. Field of the Invention

The present invention relates to, for example, a method for producing a water-insoluble liquefied fuel oil containing a hydrocarbon from biomass as a principal component, whereby the yield of the water-insoluble liquefied fuel oil is high, and a method for producing a water-insoluble liquefied fuel oil from biomass, whereby the yield of the water-insoluble liquefied fuel oil is high and the degeneration of the solvent to be used for liquefaction is low.

2. Background Art

Examples of conventional methods for producing liquefied fuel oils using biomass as a feedstock are as follows. Patent Documents 1 to 3 disclose that a liquefaction catalyst for biomass, which is potassium carbonate dissolved in water and biomass in the form of wood chips are processed at 200° C. to 385° C., thereby producing a liquefied fuel oil in a yield ranging from 23 wt % to 45 wt % based on the solid biomass content.

Patent Document 4 discloses that wood chips, water, a neutral oxygen-containing solvent (acetone, methyl ethyl ketone, ethyl acetate, 1-butanol, etc.), and potassium carbonate are processed at 300° C., thereby producing a liquefied fuel oil in a yield ranging from 33 wt % to 68 wt % based on the solid biomass content.

Patent Document 5 discloses that wood chips, water, a phenolic compound (phenol or cresol), and an alkali metal compound or alkaline earth metal compound (potassium carbonate, sodium carbonate, calcium carbonate, sodium hydroxide, calcium hydroxide, etc.) are processed at 350° C., thereby producing a liquefied fuel oil in a yield ranging from 47 wt % to 65 wt % based on the solid biomass content.

Patent Document 6 discloses that cellulosic biomass and one type of organic solvent selected from aliphatic ketones and fatty alcohols (acetone, methyl ethyl ketone, methanol, ethanol, etc.) are subjected to pyrolysis at a temperature equal to or higher than a supercritical temperature in the presence of an activated carbon catalyst, thereby producing a liquefied fuel oil in a yield of about 50 wt % based on the solid biomass content.

Patent Document 7 discloses that lignocellulosic biomass is processed with a supercritical alcohol (methanol, etc.) at 320° C. to 360° C., thereby producing a liquefied fuel oil that is alcohol-soluble in a yield of about 70 wt % based on the solid biomass content.

Patent Document 8 discloses that biomass is processed with 1-octanol at 195° C. to 500° C., thereby producing a liquefied fuel oil in a maximum yield of about 90 wt % based on the solid biomass content.

Patent Document 9 discloses that biomass is processed with a mixed solvent obtained by adding 5 vol % to 20 vol % of water to a fatty alcohol having 1 to 8 carbon atoms (methanol, etc.) under supercritical or subcritical conditions for the alcohol, thereby producing a liquefied fuel oil in a maximum yield of 95 wt % based on the solid biomass content.

Patent Document 10 discloses that ligneous biomass is processed with an organic solvent such as anthracene at 250° C. to 400° C., thereby producing a liquefied fuel oil that is soluble in acetone in a yield of 45 wt % based on the solid biomass content.

Also, the present inventors have already found and disclosed a method for producing a liquefied fuel oil, which comprises adding a solvent that contains an organic solvent and is adjusted to have a moisture percentage ranging from 10 wt % to 25 wt % (including moisture contained in the biomass) to the biomass containing lignocellulose and then performing liquefaction at a temperature between 250° C. and 350° C. (Patent Documents 11 and 12).

Non-Patent Document 1 discloses that a liquefied fuel oil obtained by pyrolysis of biomass is subjected to hydrotreating with a Co/Mo catalyst, or cracking with a zeolite catalyst, thereby producing the high-grade liquefied fuel oil.

[Patent Document 1] JP Patent No. 1653948
[Patent Document 2] JP Patent No. 1653949
[Patent Document 3] JP Patent No. 1791733
[Patent Document 4] JP Patent No. 1660994
[Patent Document 5] JP Patent No. 1688399
[Patent Document 6] JP Patent No. 1888337
[Patent Document 7] JP Patent No. 3755076
[Patent Document 8] JP Patent Publication (Kokai) No. 2005-288406 A
[Patent Document 9] JP Patent Publication (Kokai) No. 2005-296906 A
[Patent Document 10] JP Patent Publication (Kokai) No. 2006-063310 A
[Patent Document 11] International Publication WO 2009/014225 Pamphlet
[Patent Document 12] JP Patent Publication (Kokai) No. 2009-46661 A
[Non-Patent Document 1] Bridgwater, A. V., Production of high grade fuels and chemicals from catalytic pyrolysis of biomass, Catal. Today, 1996, 29 (1/4), pp. 285-295

SUMMARY OF THE INVENTION

The methods for producing liquefied fuel oils using biomass as a feedstock disclosed in the above Patent Documents 1 to 3 are problematic in that water-insoluble lignin is not sufficiently liquefied because water is used alone as a solvent for liquefaction, resulting in low yields of the liquefied fuel oils based on the solid biomass content.

In the method for producing a liquefied fuel oil using biomass as a feedstock disclosed in the above-mentioned Patent Document 4, the liquefaction of water-insoluble lignin has been improved with the use of 5 parts water and 1 part neutral oxygen-containing solvent as solvents for liquefaction. However, the effect obtained is insufficient, and the yield of the liquefied fuel oil based on the solid biomass content has not been substantially improved.

In the method for producing a liquefied fuel oil using biomass as a feedstock disclosed in the above-mentioned Patent Document 5, the liquefaction of water-insoluble lignin has been improved with the use of a mixed solvent of water/phenolic compound=5/1 to 1/1 as a solvent for liquefaction. However, the effect obtained is insufficient, and the yield of the liquefied fuel oil based on the solid biomass content has not been substantially improved.

In the method for producing a liquefied fuel oil using biomass as a feedstock disclosed in the above-mentioned Patent Document 6, one type of organic solvent selected from aliphatic ketones and fatty alcohols is used as a solvent for liquefaction. However, the biomass decomposition reaction does not proceed sufficiently, and the yield of the liquefied fuel oil based on the solid biomass content has not been substantially improved.

In the method for producing a liquefied fuel oil using biomass as a feedstock disclosed in the above-mentioned Patent Document 7, an alcohol (methanol, etc.) in a supercritical state is used as a solvent for liquefaction, thereby improving the yield of the liquefied fuel oil based on the solid biomass content up to 70 wt %. However, the method is problematic in that an expensive liquefaction reactor is necessary because the pressure at which the biomass is liquefied is as high as 43 MPa.

In the method for producing a liquefied fuel oil using biomass as a feedstock disclosed in the above-mentioned Patent Document 8, 1-octanol is used as a solvent for liquefaction, thereby improving the yield of the liquefied fuel oil based on the solid biomass content up to 90 wt %. However, the method is problematic in that the amount of 1-octanol used is as large as 32.7 liters per kilogram of biomass, making the cost for heating the solvent high.

In the method for producing a liquefied fuel oil using biomass as a feedstock disclosed in the above-mentioned Patent Document 9, a mixed solvent obtained by adding 5 vol % to 20 vol % of water to a fatty alcohol having 1 to 8 carbon atoms (methanol, etc.) is used as a solvent for liquefaction, thereby improving the yield of the liquefied fuel oil based on the solid biomass content up to 95 wt %. However, the method is problematic in that since the moisture content in the biomass has not been considered, the yield decreases when biomass with a high moisture content is used.

Also, in the methods disclosed in the above-mentioned Patent Documents 1 to 9, oxygen-containing water or an organic solvent is used, and the liquefied fuel oil yield based on the solid biomass content tends to be high. However, the methods have drawbacks such that an oxygen-containing liquefied fuel component is rich, moisture is contained because of affinity for water, and the heat value of the liquefied fuel oil cannot be increased.

In the method for producing a liquefied fuel oil using biomass as a feedstock disclosed in the above-mentioned Patent Document 10, a heavy oil (anthracene, etc.) or a portion of the generated liquefied fuel oil (self-solvent) is used as a solvent for liquefaction. However, the biomass decomposition reaction does not proceed sufficiently and the yield of the liquefied fuel oil based on the solid biomass content has not been substantially improved. Also, a liquefied fuel oil generated from biomass by this method contains oxygen and water, so that the liquefied fuel oil is not suitable for applications of high grade liquid fuel such as a light oil.

In the above-mentioned Non-Patent Document 1, it is disclosed that a liquefied fuel oil obtained from biomass is subjected to hydrotreating or cracking, thereby converting the liquefied fuel oil into the water-insoluble and producing the liquefied fuel oil as graded up having high heating value. However, Non-Patent Document 1 does not consider the degeneration of the reaction solvent used for liquefaction of biomass.

Meanwhile, in the above-mentioned Patent Documents 11 and 12, the present inventors have disclosed a method for producing a liquefied fuel oil using biomass as a feedstock, which comprises adding a solvent containing an organic solvent and having a moisture percentage predetermined in view of the moisture in biomass to biomass and then subjecting the resultant to liquefaction at a predetermined temperature. According to the method, the liquefied fuel oil yield based on the solid biomass content is high. However, in the above-mentioned Patent Documents 11 and 12, conversion of an oxygen-containing compound in a liquefied fuel oil obtained after liquefaction to a hydrocarbon, conversion of a water-soluble organic substance contained in an aqueous phase to a hydrocarbon and degeneration of the solvent used for liquefaction have not been considered.

In view of the above circumstances, an object of the present invention is to provide a method for producing a water-insoluble liquefied fuel oil containing a hydrocarbon from biomass, whereby conversion of an oxygen-containing compound in a liquefied fuel oil obtained after liquefaction to a hydrocarbon and conversion of a water-soluble organic substance contained in an aqueous phase to a hydrocarbon are performed and the water-insoluble liquefied fuel oil yield is improved. Furthermore, an object of the present invention is to provide a method for producing a water-insoluble liquefied fuel oil, whereby the water-insoluble liquefied fuel oil yield is improved and the degeneration of the solvent to be used for liquefaction of biomass is low.

As a result of intensive studies to achieve the above object, the present inventors have found that the yield of a water-insoluble liquefied fuel oil is high when it is obtained by: adding water and an organic solvent to biomass containing lignocellulose; performing liquefaction at a predetermined temperature at which pyrolysis of the biomass is performed; and then simultaneously with or after liquefaction, performing dehydration by causing a mixture of the thus obtained liquefied fuel oil containing the organic solvent and an aqueous phase containing a water-soluble organic substance to come into contact with a dehydration catalyst under pressure, or performing hydrogenation by causing the mixture to come into contact with hydrogen in the presence of a hydrogenation catalyst under pressure; and then separating a water-insoluble liquefied fuel oil from the mixture after dehydration or hydrogenation. The present inventors have also found that the yield of a water-insoluble liquefied fuel oil is high and the degeneration of an aromatic hydrocarbon solvent used for liquefaction of biomass is low when it is obtained by: adding water and an aromatic hydrocarbon solvent to biomass containing lignocellulose; performing liquefaction at a predetermined temperature at which pyrolysis of the biomass is performed; and then performing dehydration by causing the thus obtained liquefied fuel oil containing the aromatic hydrocarbon solvent after liquefaction to come into contact with a dehydration catalyst under pressure; and then separating a water-insoluble liquefied fuel oil from the mixture after dehydration. Hence, the present inventors have completed the present invention.

Specifically, the present invention relates to a method for producing a water-insoluble liquefied fuel oil containing a hydrocarbon, comprising the steps of: subjecting a mixture that contains biomass containing lignocellulose, an organic solvent, and water to liquefaction; simultaneously with or after liquefaction, causing a mixture of the liquefied fuel oil that contains the organic solvent and an aqueous phase that contains a water-soluble organic substance to come into contact with a dehydration catalyst under pressure and then subjecting the resultant to dehydration, or causing the mixture of a liquefied fuel oil that contains the organic solvent and an aqueous phase that contains a water-soluble organic substance to come into contact with hydrogen in the presence of a hydrogenation catalyst under pressure, and then subjecting the resultant to hydrogenation; and separating a water-insoluble liquefied fuel oil from the mixture after dehydration or hydrogenation. The present invention also relates to a method for producing a water-insoluble liquefied fuel oil, comprising the steps of: subjecting a mixture that contains biomass containing lignocellulose, an aromatic hydrocarbon solvent, and water to liquefaction; causing the liquefied fuel oil that contains the aromatic hydrocarbon solvent after liquefaction to come into contact with a dehydration catalyst under pressure and then subjecting the resultant to dehydration; and separating a water-insoluble liquefied fuel oil from the mixture after dehydration.

Liquefaction is performed at a temperature between 250° C. and 370° C., for example. An example of an organic solvent to be used for liquefaction is an aromatic hydrocarbon solvent having 6 to 12 carbon atoms, such as xylene.

Dehydration or hydrogenation is performed at a temperature between 250° C. and 400° C., for example. Moreover, dehydration or hydrogenation is performed under a pressure of between 1 MPaG and 20 MPaG, for example.

Furthermore, the aqueous phase containing a water-soluble organic substance separated after liquefaction, dehydration and/or hydrogenation can be reused as some or all of the water to be used for liquefaction.

Furthermore, the organic solvent (or the aromatic hydrocarbon solvent) separated from the mixture after dehydration or hydrogenation can be reused as some or all of the organic solvent (or the aromatic hydrocarbon solvent) for liquefaction.

Effect of the Invention

According to the method for producing a water-insoluble liquefied fuel oil containing a hydrocarbon of the present invention, the liquefaction step is performed by adding water and an organic solvent to biomass and then the dehydration step or the hydrogenation step is performed for a mixture of a liquefied fuel oil and an aqueous phase simultaneously with or following the liquefaction step while maintaining the yield of the liquefied fuel oil based on the solid biomass content. Therefore, the yield of the water-insoluble liquefied fuel oil can be increased, as well as the concentration of an organic substance in the aqueous phase containing a water-soluble organic substance can be reduced, and a water-insoluble liquefied fuel oil can be obtained from biomass with good productivity.

According to the method for producing a water-insoluble liquefied fuel oil of the present invention, the liquefaction step is performed by adding water and an aromatic hydrocarbon solvent to biomass and then the dehydration step is performed for a liquefied fuel oil following the liquefaction step while maintaining the yield of the liquefied fuel oil based on the solid biomass content. Therefore, the yield of the water-insoluble liquefied fuel oil can be increased, as well as the degeneration of the aromatic hydrocarbon solvent to be used for liquefaction can be reduced, and a water-insoluble liquefied fuel oil can be obtained from biomass with good productivity.

This description includes part or all of the contents as disclosed in the description and/or drawings of Japanese Patent Application Nos. 2009-136435 and 2009-136438, which are the priority documents of the present application.

DETAILED DESCRIPTION OF THE PREFERRED EMBODIMENTS

The present invention is explained in detail as follows.
1. The method for producing a water-insoluble liquefied fuel oil containing a hydrocarbon according to the present invention (hereinafter referred to as "the method 1 according to the present invention")

The present invention relates to a method for producing a water-insoluble liquefied fuel oil containing a hydrocarbon, comprising the steps of: subjecting a mixture of biomass containing lignocellulose, an organic solvent, and water to liquefaction; simultaneously with or after liquefaction, causing a mixture of a liquefied fuel oil containing the organic solvent and an aqueous phase containing a water-soluble organic substance to come into contact with a dehydration catalyst under pressure, subjecting the resultant to dehydration, or causing a mixture of the liquefied fuel oil containing the organic solvent and an aqueous phase containing a water-soluble organic substance to come into contact with hydrogen in the presence of a hydrogenation catalyst under pressure, subjecting the resultant to hydrogenation; and separating the water-insoluble liquefied fuel oil from the mixture after dehydration or hydrogenation. According to the method 1 according to the present invention, dehydration or hydrogenation is performed, so that an oxygen-containing compound in the liquefied fuel oil obtained after liquefaction is converted to a hydrocarbon and a water-soluble organic substance contained in the aqueous phase is converted to a hydrocarbon. Hence, the yield of the water-insoluble liquefied fuel oil can be improved. Also, according to the method 1 according to the present invention, the content of an organic substance in the aqueous phase that is separated from the water-insoluble liquefied fuel oil can be reduced, and then the aqueous phase can be reused as water for liquefaction.

When dehydration is employed, examples of a hydrocarbon contained in the water-insoluble liquefied fuel oil obtained by the method 1 according to the present invention include aromatic hydrocarbons (C6 aromatic hydrocarbons such as $C_6H_6$, C7 aromatic hydrocarbons such as $C_6H_5$—$CH_3$, C8 aromatic hydrocarbons such as $C_6H_4$—$(CH_3)_2$ and $C_6H_5$—$C_2H_5$, C9 aromatic hydrocarbons such as $C_6H_3$—$(CH_3)_3$ and $C_6H_4$—$(CH_3)(C_2H_5)$, and C10 aromatic hydrocarbons such as $C_6H_2$—$(CH_3)_4$, $C_6H_3$—$(CH_3)_2(C_2H_5)$, and $C_6H_4$—$(C_2H_5)_2$, etc), and aliphatic hydrocarbons (C3 aliphatic hydrocarbons such as $C_3H_8$ and C4 aliphatic hydrocarbons such as $C_4H_{10}$, etc).

Meanwhile, when hydrogenation is employed, examples of hydrocarbons contained in the water-insoluble liquefied fuel oil obtained by the method 1 according to the present invention include hydrocarbons having cyclohexane skeletons (obtained via benzene ring hydrogenation) (C6 hydrocarbons such as $C_6H_{12}$, C7 hydrocarbons such as $C_6H_{11}$—$CH_3$, C8 hydrocarbons such as $C_6H_{10}$—$(CH_3)_2$ and $C_6H_{11}$—$C_2H_5$, C9 hydrocarbons such as $C_6H_9$—$(CH_3)_3$ and $C_6H_{10}$—$(CH_3)(C_2H_5)$, and C10 hydrocarbons such as $C_6H_8$—$(CH_3)_4$, $C_6H_9$—$(CH_3)_2(C_2H_5)$, and $C_6H_{10}$—$(C_2H_5)_2$, etc) and aliphatic hydrocarbons (C3 aliphatic hydrocarbons such as $C_3H_8$ and C4 aliphatic hydrocarbons such as $C_4H_{10}$, etc).

A water-insoluble liquefied fuel obtained by the method 1 according to the present invention contains a hydrocarbon as a principal component. Here, the term "principal component" means that the hydrocarbon accounts for a high percentage by weight of the water-insoluble liquefied fuel oil. For example, when the weight of such hydrocarbon accounts for 80 wt % or more, preferably 90 wt % or more, or particularly preferably 94 wt % or more, 95 wt % or more, 96 wt % or more, 97 wt % or more, 98 wt % or more, or 99 wt % or more of the total weight of the water-insoluble liquefied fuel, it can be said that the water-insoluble liquefied fuel oil contains a hydrocarbon as a principal component.

The biomass of the present invention includes lignocellulose. Lignocellulose is an organic compound composed of structural polysaccharides, i.e., cellulose and hemicellulose, and lignin. Biomass containing such lignocellulose can be used as a feedstock for the water-insoluble liquefied fuel oil. The lignocellulose content in the biomass is not particularly limited, but lignocellulose is preferably a principal component of the biomass. Here, the term "principal component" means that the proportion of the lignocellulose component in the biomass is high. Specifically, it is preferable to use biomass whose total content of the lignin component, cellulose component, and hemicellulose component in the solid content excluding the moisture content from the biomass is at least 50 wt %, and preferably 80 wt %. Specific examples of such biomass include staple crops such as wheat, rice, corn, soybean, barley, sorghum, sugarcane, potatoes, cassava, sugar beet, and residues thereof; oil crops such as palm, sunflower, rapeseed, Jatropha curcas, peanuts, castor-oil plant, and residues thereof; energy crops such as aleman grass, reed grass, cardoon, kenaf, miscanthus, poplar, tall fescue, napier grass, guinea grass, willow, and switch grass; forestry wastes such as forest residues, thinnings, and industrial residual scrap wood; municipal wastes and industrial wastes such as scrap wood from construction, pruning residues, and waste paper; residues of lignocellulose saccharification; ethanol distillation waste; etc.

Organic solvents to be used for liquefaction in the method 1 according to the present invention are not particularly limited as long as they are fluids at a temperature to be employed for all the steps of the method 1 according to the present invention. Specific examples of such organic solvents include paraffins, cyclic hydrocarbons, aromatic hydrocarbons, alcohols, phenols, ethers, ketones, esters, and combinations thereof.

Examples of paraffins include n-hexane, n-heptane, n-octane, n-nonane, n-decane, n-dodecane, and isomers thereof.

Examples of cyclic hydrocarbons include cyclopentane, cyclohexane, and methylcyclohexane.

Examples of aromatic hydrocarbons include benzene, toluene, ethylbenzene, xylene (o-xylene, m-xylene, and p-xylene), cumene, naphthalene, anthracene, and biphenyl.

Examples of alcohols include methanol, ethanol, diethylene glycol, 1-propanol, isopropyl alcohol, glycerol, n-butanol, 2-butanol, isobutanol, t-butyl alcohol, 1-pentanol, 2-methyl-1-butanol, 3-methyl-1-butanol, 2-methyl-2-butanol, 2,2-dimethyl-1-propanol, 1-hexanol, cyclohexanol, diethylene glycol, polyethylene glycol, and polyglycerol.

Examples of phenols include phenol, o-cresol, m-cresol, and p-cresol.

Examples of ethers include diethylether, ethyl propyl ether, and ethyl butyl ether.

Examples of ketones include acetone, methyl ethyl ketone, and diethyl ketone.

Examples of esters include methyl formate, ethyl formate, methyl acetate, ethyl acetate, and methyl butyrate.

Also, these organic solvents may be used independently, or two or more thereof may be mixed and used at arbitrary proportions.

In particular, in view of reuse for liquefaction while maintaining the yield of a liquefied fuel oil based on the solid biomass content and the low degree of degeneration in the dehydration step or the hydrogenation step, an aromatic hydrocarbon having 6 to 12 carbon atoms is preferable as an organic solvent to be used in the present invention. Examples of such aromatic hydrocarbon having 6 to 12 carbon atoms include benzene, toluene, ethylbenzene, xylene (o-xylene, m-xylene, p-xylene), and cumene. In particular, xylene is preferred.

A dehydration catalyst or a hydrogenation catalyst to be used for dehydration or hydrogenation in the method 1 according to the present invention is not particularly limited, as long as it accelerates dehydration reaction or hydrogenation reaction. Examples thereof include metal oxides such as silicate, alumina, aluminosilicate (zeolite), and titania, as well as catalysts having metals such as nickel, copper, cobalt, platinum, and palladium deposited on these metal oxides.

Hereinafter, the method 1 according to the present invention will be described in detail with reference to the Drawings.

Figure 1:
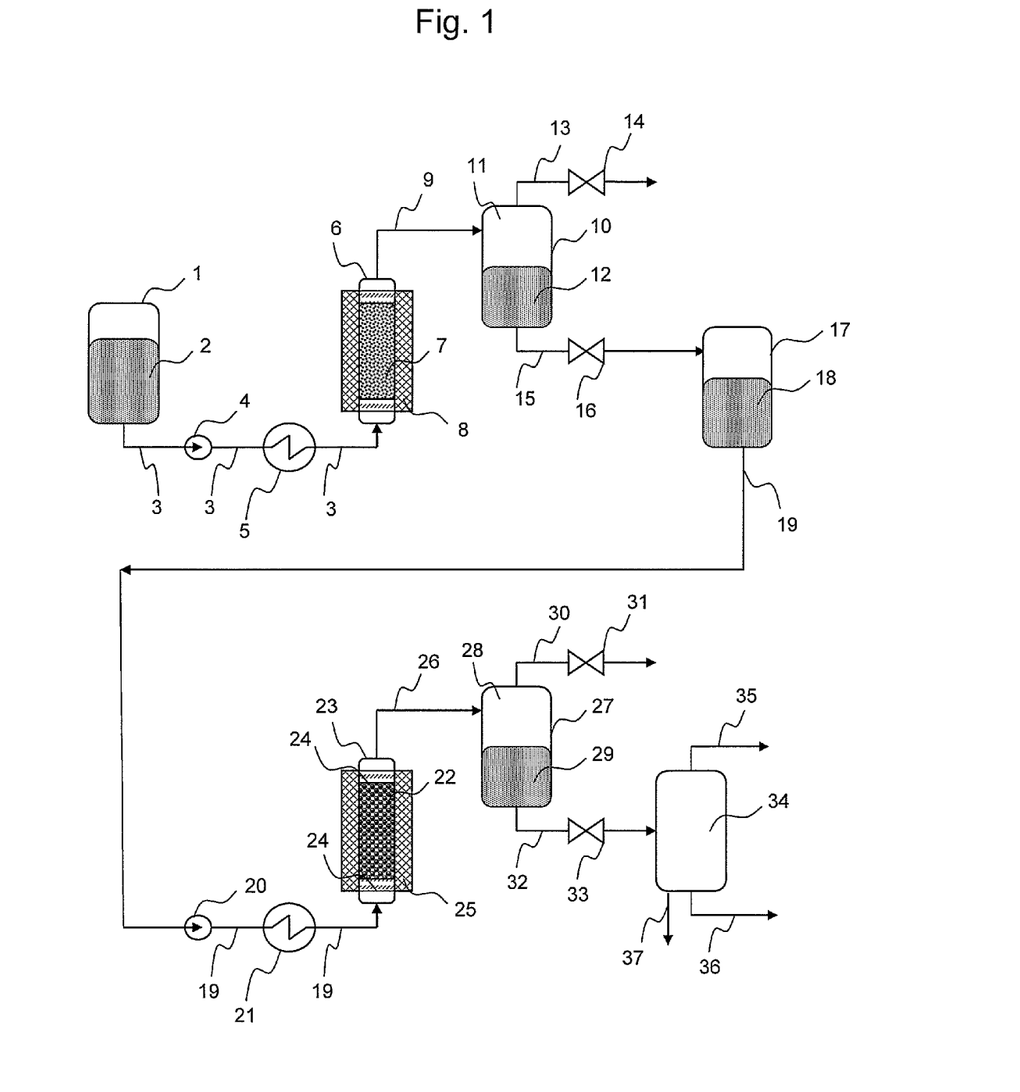
FIG. 1 shows an apparatus that can be used for the method for producing a water-insoluble liquefied fuel oil containing a hydrocarbon according to the present invention.

FIG. 1 shows an apparatus that can be used for the method 1 according to the present invention. As shown in FIG. 1, the apparatus is composed of a solvent storage tank 1, a solvent transfer pump 4, a solvent heater 5, a biomass liquefaction reactor 6, a gas/liquid separation tank 10, and a liquefied fuel mixture (oil phase and aqueous phase) reservoir 17 to be used for liquefaction as well as valves and lines connecting them in order to obtain a liquefied fuel oil by the liquefaction step.

Also, to obtain a water-insoluble liquefied fuel oil by the dehydration step or the hydrogenation step and the step for separating a water-insoluble liquefied fuel, the apparatus is composed of a liquefied fuel mixture transfer pump 20, a liquefied fuel mixture heater 21, a liquefied fuel mixture dehydration reactor or liquefied fuel mixture hydrogenation reactor 23, a gas/liquid separation tank 27, a recovery device 34 for an organic solvent from the water-insoluble liquefied fuel oil as well as valves and lines connecting them.

The apparatus shown in FIG. 1 is of a semi-continuous operation-type in which the solvent is continuously fed and biomass is fed in batches, but the apparatus to be used for the method 1 according to the present invention is not limited thereto. An apparatus to be used for the method 1 according to the present invention may be of a batch operation-type in which the solvent and biomass are injected simultaneously into the biomass liquefaction reactor where liquefaction is performed or may be of a continuous operation-type in which a slurry containing biomass dispersed in a solvent is continuously fed to the biomass liquefaction reactor via a transfer pump.

The solvent storage tank 1 stores a solvent at room temperature or in a heated state. Specifically, an organic solvent and water are stored in the storage tank 1. If the organic solvent and water do not completely dissolve with each other, the solvent cannot be fed homogeneously. Therefore, it is preferable to provide storage tanks, transfer lines, and transfer pumps separately for an organic solvent and water, following which they are mixed in the solvent transfer line 3 positioned immediately before the solvent heater 5.

Regarding water to be used for liquefaction in the method 1 according to the present invention, the moisture percentage is preferably adjusted to range from 10 wt % to 25 wt %, for example, including the moisture contained in biomass, with respect to the whole solvent (solvent containing an organic solvent and water). When the moisture percentage is lower than 10 wt %, hydrolysis of lignin and cellulose proceeds insufficiently. When the moisture percentage is higher than 25 wt %, the yield of a liquefied fuel oil decreases. For example, when xylene is used as an organic solvent, the above moisture percentage particularly preferably ranges from 15 wt % to 25 wt % including the moisture contained in biomass.

Also, as water to be used for liquefaction in the method 1 according to the present invention, an aqueous solution of an alkali metal salt or an alkaline earth metal salt (potassium carbonate, sodium carbonate, calcium carbonate, sodium hydroxide, and calcium hydroxide, etc) may be used, for example. Through addition of an alkali metal salt or an alkaline earth metal salt to a mixture for liquefaction, liquefaction and gasification reactions of biomass are accelerated. Such alkali metal salt or alkaline earth metal salt may be contained at 0.1 wt % to 5 wt % and preferably 1 wt % to 3 wt %, for example, based on the weight of the aqueous solution.

The solvent storage tank 1 is not particularly limited as long as it employs a configuration and material that can store a solvent. The storage tank 1 that can be used herein may be metallic, glass, plastic, or ceramic. When the solvent is stored at room temperature or a temperature lower than the boiling point thereof, a storage tank suitable for atmospheric pressure may be used. When the solvent is stored at a temperature equal to or higher than the boiling point thereof, a sealed pressurized storage tank is selected.

The flow rate of the solvent is selected to be 5 to 20 times the weight of the solid biomass content. If the amount of the solvent is less than 5 times the solid biomass content, the decomposition and liquefaction reactions will not occur sufficiently; whereas if the amount exceeds 20 times the same, an extremely large quantity of energy will be consumed for heating the solvent, which is undesirable. In consideration of the relationship between the yield of the liquefied fuel oil and the energy for heating the solvent, the flow rate of the solvent is particularly preferably between 8 and 15 times the weight of the solid biomass content.

The solvent 2 stored in the solvent storage tank 1 is transferred to the solvent transfer line 3, and then to the solvent transfer pump 4, where it is pressurized to a pressure equal to or higher than the vapor pressure of the solvent, and is subsequently heated by the solvent heater 5 to a predetermined reaction temperature.

The solvent transfer pump 4 used herein is not particularly limited as long as it can pressurize the solvent to a predetermined pressure. Examples of such pump include a gear pump, a multi-stage swirl pump, a cylinder pump, a plunger pump, a diaphragm pump, a rotary pump, and a snake pump.

The solvent heater 5 is not particularly limited as long as it can heat a solvent to a predetermined temperature, which is selected from a double tube heater, a shell and tube heater, a U tube heater, a spiral heater, a plate heater, an electric heater, an induction heater, and the like.

The solvent heating temperature (corresponding to a reaction temperature for liquefaction) to be employed for the solvent heater 5 is suitably determined within the range between 250° C. and 370° C. (preferably, between 250° C. and 350° C.) where the biomass undergoes pyrolysis and liquefaction reactions, in consideration of the combination of the solvent and a biomass feedstock. The heating temperature preferably ranges from 280° C. to 370° C. when oak chips are used as biomass and xylene is used as an organic solvent in order to improve the yield of the liquefied fuel oil, for example.

The solvent heated to a predetermined temperature by the solvent heater 5 is fed to the biomass liquefaction reactor 6 via the solvent transfer line 3. Liquefaction is performed within the biomass liquefaction reactor 6. The biomass liquefaction reactor 6 is charged with biomass 7 (e.g., biomass chips such as oak powder ground to several mm or less) that has been suitably dried. This biomass reacts with the solvent 2 to undergo the decomposition and liquefaction reactions thereof.

The residence time of a solvent in the biomass liquefaction reactor 6 ranges from 15 to 60 minutes, for example. When xylene is used as an organic solvent, the residence time is preferably about 30 minutes.

The biomass liquefaction reactor 6 is maintained at a predetermined temperature under control of a heating device 8 of a biomass liquefaction reactor. The heating device 8 may be provided with an electric heater installed on the outer surface of the biomass liquefaction reactor 6 or provided with a jacket installed on the outer surface of the biomass liquefaction reactor 6 and configured to allow the passage of heating medium therethrough.

The pressure (corresponding to the reaction pressure upon liquefaction) within the biomass liquefaction reactor 6 is adjusted and maintained using a gas product withdrawal valve 14 and a liquefied fuel mixture withdrawal valve 16 at a level at which the solvent and the liquefied fuel oil are not vaporized. For example, the pressure within the biomass liquefaction reactor 6 is determined to be 4 MPaG to 20 MPaG and preferably 5 MPaG to 15 MPaG.

The material of the biomass liquefaction reactor 6 is not particularly limited as long as it can withstand the liquefaction temperature and pressure, as well as solvent corrosion. Examples of such materials include carbon steel, stainless steel, nickel alloy steel, lined steel thereof, and ceramic lined steel. The configuration of the biomass liquefaction reactor 6 is also not particularly limited. A vertical tube reactor or a horizontal tube reactor is generally selected, but a loop reactor or a fluidized bed reactor may also be selected.

Next, the liquefied fuel mixture and the gas product obtained by liquefaction are transferred via a liquefied fuel mixture transfer line 9 to a gas/liquid separation tank 10. The liquefied fuel mixture obtained by liquefaction is a mixture of the liquefied fuel oil (oil phase) containing the organic solvent used for liquefaction and the aqueous phase containing a water-soluble organic substance.

The material of the gas/liquid separation tank 10 is not particularly limited as long as it can withstand the temperature and pressure of the liquefied fuel mixture and the gas product, as well as corrosion by the liquefied fuel mixture and the gas product. Examples of such materials include carbon steel, stainless steel, nickel alloy steel, lined steel thereof, and ceramic lined steel. The configuration of the gas/liquid separation tank 10 is also not particularly limited. A vertical tube tank or a horizontal tube tank is generally selected.

Separation into a gas product 11 and a liquefied fuel mixture 12 is performed in the gas/liquid separation tank 10, and the gas product 11 is withdrawn from the system via a gas product transfer line 13 and a gas product withdrawal valve 14. Meanwhile, the liquefied fuel mixture 12 is transferred to a liquefied fuel mixture reservoir 17 via a liquefied fuel mixture transfer line 15 and a liquefied fuel mixture withdrawal valve 16.

The reservoir 17 is not particularly limited as long as it employs a configuration and material that can store a liquefied fuel mixture. The reservoir 17 may be metallic, glass, plastic, or ceramic, for example. Also, when separation is performed at room temperature or a temperature lower than the boiling point of the liquefied fuel oil, a reservoir suitable for atmospheric pressure may be used. When separation is performed at a temperature equal to or higher than the boiling point of the liquefied fuel oil, a sealed pressurized reservoir is selected.

The liquefied fuel mixture 18 in the liquefied fuel mixture reservoir 17 is transferred to a liquefied fuel mixture transfer pump 20 via a liquefied fuel mixture transfer line 19. The liquefied fuel mixture is pressurized to a pressure equal to or higher than the vapor pressure thereof in the liquefied fuel mixture transfer pump 20 and then heated to a predetermined reaction temperature by a liquefied fuel mixture heater 21.

The liquefied fuel mixture transfer pump 20 used herein is not particularly limited as long as it can pressurize such mixture to a predetermined pressure. Examples of such pump include a gear pump, a multi-stage swirl pump, a cylinder pump, a plunger pump, a diaphragm pump, a rotary pump, and a snake pump.

The liquefied fuel mixture heater 21 is not particularly limited as long as it can heat the liquefied fuel mixture to a predetermined temperature, which is selected from a double tube heater, a shell and tube heater, a U tube heater, a spiral heater, a plate heater, an electric heater, an induction heater, and the like.

The temperature (corresponding to the reaction temperature for dehydration or hydrogenation) for heating the liquefied fuel mixture in the liquefied fuel mixture heater 21 is appropriately determined depending on a dehydration catalyst or a hydrogenation catalyst to be used within the range between 250° C. and 400° C. (preferably between 250° C. and 350° C.) at which a dehydration reaction or a hydrogenation reaction of the liquefied fuel mixture takes place. The temperature of 400° C. or higher is not preferred since this causes decomposition of the liquefied fuel oil or the organic solvent used for liquefaction.

The liquefied fuel mixture heated to a predetermined temperature in the liquefied fuel mixture heater 21 is fed to a liquefied fuel mixture dehydration reactor or liquefied fuel mixture hydrogenation reactor 23 via the liquefied fuel mixture transfer line 19.

The liquefied fuel mixture dehydration reactor or liquefied fuel mixture hydrogenation reactor 23 is charged with a dehydration catalyst or hydrogenation catalyst 22 in the space partitioned by perforated plates 24. Dehydration or hydrogenation can be performed by causing the liquefied fuel mixture to pass through the layer of the dehydration catalyst or hydrogenation catalyst 22. A high-heat-value water-insoluble liquefied fuel can be obtained through the dehydration reaction or hydrogenation reaction.

The amount of the dehydration catalyst or the hydrogenation catalyst to be used for charging the liquefied fuel mixture dehydration reactor or liquefied fuel mixture hydrogenation reactor 23 is determined so that a liquid hourly space velocity ranges from 1 to 6 $h^{-1}$.

In the case of hydrogenation, hydrogen is fed via a hydrogen feeding line (not shown) to the liquefied fuel mixture hydrogenation reactor 23. The amount of hydrogen to be fed ranges from 0.1 NL/h to 20 NL/h and preferably ranges from 0.5 NL/h to 2 NL/h per gram of solid biomass.

The liquefied fuel mixture dehydration reactor or liquefied fuel mixture hydrogenation reactor 23 is maintained at a predetermined temperature under control of a heating device 25 of a liquefied fuel mixture dehydration reactor or a liquefied fuel mixture hydrogenation reactor. The heating device 25 may be provided with an electric heater installed on the outer surface of the liquefied fuel mixture dehydration reactor or liquefied fuel mixture hydrogenation reactor 23 or provided with a jacket installed on the outer surface of the reactor 23 and configured to allow the passage of heating medium therethrough.

The pressure (corresponding to reaction pressure upon dehydration or hydrogenation) within the liquefied fuel mixture dehydration reactor or liquefied fuel mixture hydrogenation reactor 23 is maintained by regulating a gas product withdrawal valve 31 and a water-insoluble liquefied fuel oil·aqueous phase withdrawal valve 33. Dehydration reaction or hydrogenation reaction is preferably performed at a pressure equal to or higher than the vapor pressure of the liquefied fuel mixture. Moreover, in view of decreasing the gas product and improving the yield of a water-insoluble liquefied fuel oil, the pressure within the liquefied fuel mixture dehydration reactor or liquefied fuel mixture hydrogenation reactor 23 ranges from 1 MPaG to 20 MPaG (preferably, ranges from 5 MPaG to 10 MPaG) in terms of gauge pressure, for example.

The material of the liquefied fuel mixture dehydration reactor or liquefied fuel mixture hydrogenation reactor 23 is not particularly limited as long as it can withstand the dehydration or hydrogenation temperature and pressure, as well as corrosion by the liquefied fuel mixture. Examples of such materials include carbon steel, stainless steel, nickel alloy steel, lined steel thereof, and ceramic lined steel. The configuration of the liquefied fuel mixture dehydration reactor or liquefied fuel mixture hydrogenation reactor 23 is also not particularly limited. A vertical tube reactor or a horizontal tube reactor is generally selected, but a loop reactor or a fluidized bed reactor may also be selected.

A case in which dehydration or hydrogenation is performed after liquefaction is as described above. Liquefaction and dehydration or hydrogenation may also be performed simultaneously. Here, the term "simultaneously with" means that while liquefaction proceeds, dehydration or hydrogenation also proceeds. For example, the space partitioned by perforated plates on the downstream side of the biomass liquefaction reactor 6 (in the direction of processing) is charged with a dehydration catalyst or a hydrogenation catalyst. In this case, while liquefaction is performed, a liquefied fuel mixture obtained after liquefaction is caused to pass through the layer of the dehydration catalyst or the hydrogenation catalyst, so that dehydration or hydrogenation can be performed simultaneously with liquefaction.

Subsequently, the water-insoluble liquefied fuel oil·aqueous phase and the gas product obtained by dehydration or hydrogenation are transferred via a water-insoluble liquefied fuel oil·aqueous phase transfer line 26 to a gas/liquid separation tank 27.

The material of the gas/liquid separation tank 27 is not particularly limited as long as it can withstand the temperatures and pressures of a water-insoluble liquefied fuel oil·aqueous phase and a gas product, as well as corrosion by the water-insoluble liquefied fuel oil·aqueous phase and the gas product. Examples of such materials include carbon steel, stainless steel, nickel alloy steel, lined steel thereof, and ceramic lined steel. The configuration of the gas/liquid separation tank 27 is also not particularly limited. A vertical tube tank or a horizontal tube tank is generally selected.

Separation into a gas product 28 and a water-insoluble liquefied fuel oil·aqueous phase 29 is performed in the gas/liquid separation tank 27. The gas product 28 is withdrawn from the system via a gas product transfer line 30 and a gas product withdrawal valve 31. In the case of hydrogenation, the gas product 28 contains unreacted hydrogen gas. Meanwhile, the water-insoluble liquefied fuel oil·aqueous phase 29 containing the organic solvent used for liquefaction is transferred to a recovery device 34 for the organic solvent via a water-insoluble liquefied fuel oil·aqueous phase transfer line 32 and a water-insoluble liquefied fuel oil·aqueous phase withdrawal valve 33. The recovery device 34 separates an organic solvent from a water-insoluble liquefied fuel oil when the organic solvent used for liquefaction is separated and reused.

The material of the recovery device 34 is not particularly limited as long as it can withstand the temperature and pressure during separation, as well as corrosion by the water-insoluble liquefied fuel oil. Examples of such material include carbon steel, stainless steel, nickel alloy steel, lined steel thereof, and ceramic lined steel.

Subsequently, a water-insoluble liquefied fuel oil containing the organic solvent used for liquefaction is separated into a water-insoluble liquefied fuel oil and the organic solvent used for liquefaction in the recovery device 34 for an organic solvent. An example of a separation method is a method whereby a distillation apparatus is used as a recovery device 34 and separation is performed by distillation based on the difference between the boiling point of the water-insoluble liquefied fuel oil and that of the organic solvent used for liquefaction. A distillation method is selected from single batch distillation, continuous flash distillation, and continuous multistage distillation, for example, in view of the purity of the organic solvent to be recovered.

The operational pressure in the recovery device 34 for an organic solvent is not particularly limited and is generally ordinary pressure or reduced pressure.

The water-insoluble liquefied fuel oil separated by the recovery device 34 for an organic solvent is withdrawn from the system via a water-insoluble liquefied fuel oil transfer line 36 and can be used as a high-heat-value water-insoluble liquefied fuel oil.

Meanwhile, the thus separated organic solvent is circulated via a solvent recovery line 35 to the solvent storage tank 1, following which it can be reused as a solvent for liquefaction. As described above, through the reuse of such organic solvent, the amount of an organic solvent that is newly supplied for liquefaction can be reduced.

In addition, a water-insoluble liquefied fuel oil containing an organic solvent can be directly used as a water-insoluble liquefied fuel oil without separating the organic solvent used for liquefaction.

Also, in the recovery device 34, a water-insoluble liquefied fuel oil containing the organic solvent used for liquefaction and an aqueous phase undergo oil water separation into two phases. Accordingly, phase separation is performed during a step before or after the above distillation operation. At this time, the aqueous phase contains a water-soluble organic substance and water. Therefore, the aqueous phase in the recovery device 34 can be circulated via the aqueous phase recovery line 37 to the solvent storage tank 1, so that it can be reused as water (solvent) for liquefaction. In addition, at the time of circulation, water obtained by removing a water-soluble organic substance from the aqueous phase may also be reused. As described above, such reuse of the aqueous phase enables waste water treatment cost reduction.

According to the method 1 according to the present invention, while maintaining the yield of a liquefied fuel oil based on the solid biomass content, the dehydration step or the hydrogenation step is performed for a mixture of a liquefied fuel oil and an aqueous phase simultaneously with or following the liquefaction step. Hence, the yield of the water-insoluble liquefied fuel oil can be increased and the concentration of organic substances in the aqueous phase containing the water-soluble organic substance can be decreased.

2. The method for producing a water-insoluble liquefied fuel oil according to the present invention (hereinafter referred to as "the method 2 according to the present invention")

Furthermore, the present invention relates to a method for producing a water-insoluble liquefied fuel oil, comprising the steps of: subjecting a mixture that contains biomass containing lignocellulose, an aromatic hydrocarbon solvent, and water to liquefaction; causing the liquefied fuel oil that contains the aromatic hydrocarbon solvent after liquefaction to come into contact with a dehydration catalyst under pressure and then subjecting the resultant to dehydration; and separating a water-insoluble liquefied fuel oil from the mixture after dehydration. According to the method 2 according to the present invention, a high-heat-value water-insoluble liquefied fuel oil can be obtained under the condition in which degeneration of the aromatic hydrocarbon solvent which is used in the liquefaction step and remains after dehydration is low. Here, the term "degeneration" means that an aromatic ring is decomposed, thereby converting an aromatic substance to substances other than an aromatic substance. The water-insoluble liquefied fuel oil obtained by the method 2 according to the present invention contains alkyl benzenes (toluene, xylene, etc.), aliphatic hydrocarbons (hexane, heptane, etc.), etc., for example.

Aromatic hydrocarbon solvents to be used for liquefaction in the method 2 according to the present invention are not particularly limited as long as they are fluids at a temperature to be employed for all the steps of the method 2 according to the present invention. Specific examples of such aromatic hydrocarbon solvents include benzene, toluene, ethylbenzene, xylene (o-xylene, m-xylene, and p-xylene), cumene, naphthalene, anthracene, and biphenyl. Also, these aromatic hydrocarbon solvents may be used independently, or two or more thereof may be mixed and used at arbitrary proportions.

A dehydration catalyst to be used for dehydration in the method 2 according to the present invention is not particularly limited, as long as it accelerates dehydration reaction. Examples thereof include metal oxides such as silicate, alumina, aluminosilicate (zeolite), and titania.

Hereinafter, the method 2 according to the present invention will be described in detail with reference to the Drawings.

Figure 2:
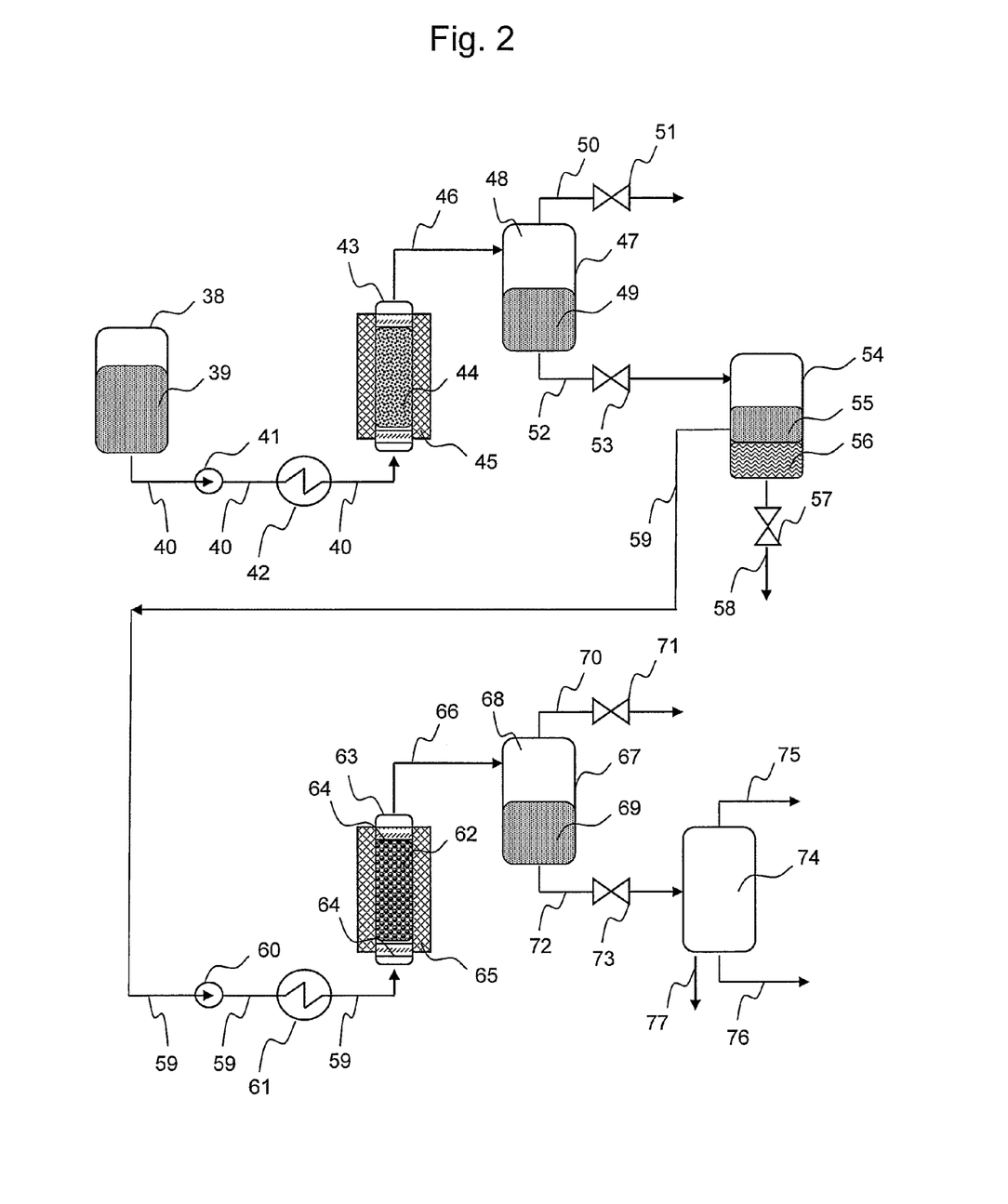
FIG. 2 shows an apparatus that can be used for the method for producing a water-insoluble liquefied fuel oil according to the present invention.

FIG. 2 shows an apparatus that can be used for the method 2 according to the present invention. As shown in FIG. 2, the apparatus is composed of a solvent storage tank 38, a solvent transfer pump 41, a solvent heater 42, a biomass liquefaction reactor 43, a gas/liquid separation tank 47, and oil-water separation reservoir 54 of a liquefied fuel oil to be used for liquefaction as well as valves and lines connecting them in order to obtain a liquefied fuel oil by the liquefaction step.

Also, to obtain a water-insoluble liquefied fuel oil by the dehydration step and the step for separating a water-insoluble liquefied fuel, the apparatus is composed of a liquefied fuel oil transfer pump 60, a liquefied fuel oil heater 61, a liquefied fuel oil dehydration reactor 63, a gas/liquid separation tank 67, a recovery device 74 for an aromatic hydrocarbon solvent from the dehydrated liquefied fuel oil as well as valves and lines connecting them.

The apparatus shown in FIG. 2 is of a semi-continuous operation-type in which the solvent is continuously fed and biomass is fed in batches, but the apparatus to be used for the method 2 according to the present invention is not limited thereto. An apparatus to be used for the method 2 according to the present invention may be of a batch operation-type in which the solvent and biomass are injected simultaneously into the biomass liquefaction reactor where liquefaction is performed or may be of a continuous operation-type in which a slurry containing biomass dispersed in a solvent is continuously fed to the biomass liquefaction reactor via a transfer pump.

As the solvent storage tank 1 shown in FIG. 1, the solvent storage tank 38 also stores a solvent at room temperature or in a heated state. Specifically, an aromatic hydrocarbon solvent and water are stored in the storage tank 38. If the aromatic hydrocarbon solvent and water do not completely dissolve with each other, the solvent cannot be fed homogeneously. Therefore, it is preferable to provide storage tanks, transfer lines, and transfer pumps separately for an aromatic hydrocarbon solvent and water, following which they are mixed in the solvent transfer line 40 positioned immediately before the solvent heater 42.

Regarding water to be used for liquefaction in the method 2 according to the present invention, the moisture percentage is preferably adjusted to range from 10 wt % to 25 wt %, for example, including the moisture contained in biomass, with respect to the whole solvent (solvent containing an aromatic hydrocarbon solvent and water). When the moisture percentage is lower than 10 wt %, hydrolysis of lignin and cellulose proceeds insufficiently. When the moisture percentage is higher than 25 wt %, the yield of a liquefied fuel oil decreases. For example, when xylene is used as an aromatic hydrocarbon solvent, the above moisture percentage particularly preferably ranges from 15 wt % to 25 wt % including the moisture contained in biomass.

The solvent storage tank 38 may be the same as the solvent storage tank 1 shown in FIG. 1.

The flow rate of the solvent may be the same as that of the method 1 according to the present invention.

The solvent 39 stored in the solvent storage tank 38 is transferred to the solvent transfer line 40, and then to the solvent transfer pump 41, where it is pressurized to a pressure equal to or higher than the vapor pressure of the solvent, and is subsequently heated by the solvent heater 42 to a predetermined reaction temperature.

The solvent transfer pump 41 and the solvent heater 42 may be the same as the solvent transfer pump 4 and the solvent heater 5 shown in FIG. 1, respectively.

The solvent heating temperature (corresponding to a reaction temperature for liquefaction) to be employed for the solvent heater 42 is suitably determined within the range between 250° C. and 370° C. (preferably, between 250° C. and 350° C.) where the biomass undergoes pyrolysis and liquefaction reactions, in consideration of the combination of the solvent and a biomass feedstock. The heating temperature preferably ranges from 280° C. to 370° C. when oak chips are used as biomass and xylene is used as an aromatic hydrocarbon solvent in order to improve the yield of the liquefied fuel oil, for example.

The solvent heated to a predetermined temperature by the solvent heater 42 is fed to the biomass liquefaction reactor 43 via the solvent transfer line 40. Liquefaction is performed within the biomass liquefaction reactor 43. The biomass liquefaction reactor 43 is charged with biomass 44 (e.g., biomass chips such as oak powder ground to several mm or less) that has been suitably dried. This biomass reacts with the solvent 39 to undergo the decomposition and liquefaction reactions thereof.

The residence time of a solvent in the biomass liquefaction reactor 43 ranges from 15 to 60 minutes, for example. When xylene is used as an aromatic hydrocarbon solvent, the residence time is preferably 30 minutes.

The biomass liquefaction reactor 43 is maintained at a predetermined temperature under control of a heating device 45 of a biomass liquefaction reactor. The heating device 45 may be the same as the heating device 8 of a biomass liquefaction reactor shown in FIG. 1.

The pressure (corresponding to the reaction pressure upon liquefaction) within the biomass liquefaction reactor 43 is adjusted and maintained using a gas product withdrawal valve 51 and a liquefied fuel oil withdrawal valve 53 at a level at which the solvent and the liquefied fuel oil are not vaporized. For example, the pressure within the biomass liquefaction reactor 43 is determined to be 4 MPaG to 20 MPaG and preferably 5 MPaG to 15 MPaG.

The material and configuration of the biomass liquefaction reactor 43 may be the same as those of the biomass liquefaction reactor 6 shown in FIG. 1.

Next, the liquefied fuel oil and the gas product obtained by liquefaction are transferred via a liquefied fuel oil transfer line 46 to a gas/liquid separation tank 47.

The material and configuration of the gas/liquid separation tank 47 may be the same as those of the gas/liquid separation tank 10 shown in FIG. 1.

Separation into a gas product 48 and a liquefied fuel oil 49 is performed in the gas/liquid separation tank 47, and the gas product 48 is withdrawn from the system via a gas product transfer line 50 and a gas product withdrawal valve 51. Meanwhile, the liquefied fuel oil 49 is transferred to an oil-water separation reservoir 54 of a liquefied fuel oil via a liquefied fuel oil transfer line 52 and a liquefied fuel oil withdrawal valve 53.

The oil-water separation reservoir 54 is not particularly limited as long as it employs a configuration and material that can separate an oil phase and an aqueous phase from a liquefied fuel oil. The reservoir 54 may be metallic, glass, plastic, or ceramic, for example. Also, when separation is performed at room temperature or a temperature lower than the boiling point of the liquefied fuel oil, a reservoir suitable for atmospheric pressure may be used. When separation is performed at a temperature equal to or higher than the boiling point of the liquefied fuel oil, a sealed pressurized reservoir is selected.

In the oil-water separation reservoir 54 of a liquefied fuel oil, a liquefied fuel oil (oil phase) 55 containing the aromatic hydrocarbon solvent used for liquefaction is separated as an upper phase, and an aqueous phase 56 containing a water-soluble organic substance is separated as a bottom phase. The aqueous phase 56 can be circulated via an aqueous phase transfer line 58 and an aqueous phase withdrawal valve 57 to the solvent storage tank 38, so that it can be reused as water (solvent) for liquefaction. In addition, at the time of circulation, water obtained by removing a water-soluble organic substance from the aqueous phase may also be reused. Thus, such reuse of the aqueous phase enables waste water treatment cost reduction.

The liquefied fuel oil (oil phase) 55 is fed to a liquefied fuel oil dehydration reactor 63 via a liquefied fuel oil transfer line 59, a liquefied fuel oil transfer pump 60 and a liquefied fuel oil heater 61. Specifically, the liquefied fuel oil (oil phase) 55 is transferred via the liquefied fuel oil transfer line 59 to the liquefied fuel oil transfer pump 60. Subsequently, the liquefied fuel oil (oil phase) 55 is pressurized to a pressure equal to or higher than the vapor pressure thereof in the liquefied fuel oil transfer pump 60 and then heated to a predetermined reaction temperature by the liquefied fuel oil heater 61.

Here, the liquefied fuel oil transfer pump 60 and the liquefied fuel oil heater 61 may be the same as the liquefied fuel mixture transfer pump 20 and the liquefied fuel mixture heater 21 shown in FIG. 1, respectively.

The temperature (corresponding to the reaction temperature for dehydration) for heating the liquefied fuel oil in the liquefied fuel oil heater 61 is appropriately determined depending on a dehydration catalyst to be used within the range between 250° C. and 400° C. (preferably between 250° C. and 350° C.) at which a dehydration reaction of the liquefied fuel oil takes place. The temperature of 400° C. or higher is not preferred since this causes decomposition of the liquefied fuel oil or the aromatic hydrocarbon solvent used for liquefaction.

The liquefied fuel oil (containing the aromatic hydrocarbon solvent used for liquefaction) heated to a predetermined temperature in the liquefied fuel oil heater 61 is fed to a liquefied fuel oil dehydration reactor 63 via the liquefied fuel oil transfer line 59. The liquefied fuel oil dehydration reactor 63 is charged with a dehydration catalyst 62 in the space partitioned by perforated plates 64. Dehydration can be performed by causing the liquefied fuel oil 55 to pass through the layer of the dehydration catalyst 62. A high-heat-value water-insoluble liquefied fuel can be obtained through the dehydration reaction.

The amount of the dehydration catalyst to be used for charging the liquefied fuel oil dehydration reactor 63 is determined so that a liquid hourly space velocity ranges from 1 to 6 $h^{-1}$.

The liquefied fuel oil dehydration reactor 63 is maintained at a predetermined temperature under control of a heating device 65 of a liquefied fuel oil dehydration reactor. The heating device 65 may be the same as the heating device 25 shown in FIG. 1.

The pressure (corresponding to reaction pressure upon dehydration) within the liquefied fuel oil dehydration reactor 63 is maintained by regulating a gas product withdrawal valve 71 and a water-insoluble liquefied fuel oil withdrawal valve 73. Dehydration reaction is preferably performed at a pressure equal to or higher than the vapor pressure of the liquefied fuel oil. Moreover, in view of decreasing the gas product and improving the yield of a water-insoluble liquefied fuel oil, the pressure within the liquefied fuel oil dehydration reactor 63 ranges from 1 MPaG to 20 MPaG (preferably, ranges from 2 MPaG to 10 MPaG) in terms of gauge pressure, for example.

The material and configuration of the liquefied fuel oil dehydration reactor 63 may be the same as those of the liquefied fuel mixture dehydration reactor 23 shown in FIG. 1.

Subsequently, the water-insoluble liquefied fuel oil and the gas product obtained by dehydration are transferred via a water-insoluble liquefied fuel oil transfer line 66 to a gas/liquid separation tank 67.

The material and configuration of the gas/liquid separation tank 67 may be the same as those of the gas/liquid separation tank 27 shown in FIG. 1.

Separation into a gas product 68 and a water-insoluble liquefied fuel oil 69 is performed in the gas/liquid separation tank 67. The gas product 68 is withdrawn from the system via a gas product transfer line 70 and a gas product withdrawal valve 71. Meanwhile, the water-insoluble liquefied fuel oil 69 containing the aromatic hydrocarbon solvent used for liquefaction is transferred to a recovery device 74 for the aromatic hydrocarbon solvent via a water-insoluble liquefied fuel oil transfer line 72 and a water-insoluble liquefied fuel oil withdrawal valve 73.

The material of the recovery device 74 may be the same as that of the recovery device 34 for organic solvent shown in FIG. 1.

Subsequently, a water-insoluble liquefied fuel oil 69 containing the aromatic hydrocarbon solvent used for liquefaction is separated into a water-insoluble liquefied fuel oil and the aromatic hydrocarbon solvent used for liquefaction in the recovery device 74 for an aromatic hydrocarbon solvent. An example of a separation method is a method whereby a distillation apparatus is used as a recovery device 74 and separation is performed by distillation based on the difference between the boiling point of the water-insoluble liquefied fuel oil and that of the aromatic hydrocarbon solvent used for liquefaction. A distillation method is selected from single batch distillation, continuous flash distillation, and continuous multistage distillation, for example, in view of the purity of the aromatic hydrocarbon solvent to be recovered.

The operational pressure in the recovery device 74 for an aromatic hydrocarbon solvent is not particularly limited and is generally ordinary pressure or reduced pressure.

Also, in the recovery device 74, when a water-insoluble liquefied fuel oil 69 containing the aromatic hydrocarbon solvent used for liquefaction undergo oil water separation into two phases, phase separation can be performed during a step before the distillation operation. At this time, the aqueous phase contains a water-soluble organic substance and water. Therefore, as the aqueous phase 56 separated in the above-described liquefaction, the aqueous phase in the recovery device 74 can be also circulated via the aqueous phase recovery line 77 to the solvent storage tank 38, so that it can be reused as water (solvent) for liquefaction.

The water-insoluble liquefied fuel oil separated by the recovery device 74 for an aromatic hydrocarbon solvent is withdrawn from the system via a water-insoluble liquefied fuel oil transfer line 76 and can be used as a high-heat-value water-insoluble liquefied fuel oil.

Meanwhile, the thus separated aromatic hydrocarbon solvent is circulated via a solvent recovery line 75 to the solvent storage tank 38, following which it can be reused as a solvent for liquefaction. As described above, through the reuse of such aromatic hydrocarbon solvent, the amount of an aromatic hydrocarbon solvent that is newly supplied for liquefaction can be reduced.

According to the method 2 according to the present invention, while maintaining the yield of a liquefied fuel oil based on the solid biomass content, the dehydration step following the liquefaction step is performed for a liquefied fuel oil. Hence, the yield of the water-insoluble liquefied fuel oil can be increased.

EXAMPLES

The present invention will be described in further detail in reference to the Examples, but the technical scope of the present invention is not limited by the Examples.

Example 1

Oak wood was ground with a cutter mill and then dried. Subsequently, the dried product was passed through a 16-mesh sieve and then a powder that did not pass through a 32-mesh sieve (particle size: 1 mm or less) was prepared. This oak powder was further dried with a dryer and then adjusted to have a moisture percentage of about 15 wt %. A biomass liquefaction reactor was charged with 42 g (with a solid biomass content of 36 g and a moisture content of 6 g) of the oak powder (as a biomass feedstock) adjusted to have the aforementioned particle size and moisture percentage.

While xylene (Nakalai Tesque, a special grade reagent) for use as a solvent for liquefaction was transferred at a flow rate of 360 g/h via a high-pressure pump and an aqueous solution containing 5 wt % potassium carbonate was transferred at a flow rate of 84 g/h via another high-pressure pump, the solvent comprising xylene and an aqueous solution containing potassium carbonate was heated by a solvent heater to 300° C. Thereafter the solvent was allowed to pass through the above biomass liquefaction reactor for 1 hour in order to perform biomass liquefaction. The reaction pressure during liquefaction was adjusted to 12 MPaG.

Also, a liquefied fuel oil dehydration reactor charged with 50 g of a zeolite catalyst H/ZSM-5 (Si/Al=45) was arranged downstream of the biomass liquefaction reactor. Following biomass liquefaction, dehydration was performed. The temperature and pressure of the dehydration reactor were the same as those for liquefaction (300° C. and 12 MPaG, respectively).

Since the liquefaction time was 1 hour in this case, the amount of xylene fed to the biomass was 360 g and the amount of an aqueous solution containing potassium carbonate (including moisture contained in the biomass) was 90 g. The total amount of a reaction solvent (aqueous solution containing xylene and potassium carbonate) caused to pass through the biomass was 12.5 times the solid biomass content in terms of ratio by weight (450 g/36 g=12.5).

The weight of the water-insoluble liquefied fuel oil recovered after biomass liquefaction and dehydration was 392 g (80.7 wt %), the weight of the aqueous phase was 75 g (15.4 wt %), and the weight of loss (unreacted solids, gas products, and the like) was 19 g (3.9 wt %).

The components of the thus obtained water-insoluble liquefied fuel oil and aqueous phase were analyzed using a gas-chromatograph mass spectrometer (Shimadzu Corporation, GCMS-QP5000). The water-insoluble liquefied fuel oil was composed of 94.1 wt % hydrocarbons and 5.9 wt % oxygen-containing organic compounds. This means that 369 g (=392 g×94.1%) of hydrocarbons was generated and that 9 g (25 wt %) out of 36 g of the solid biomass content could be converted to a hydrocarbon liquefied fuel oil. In addition, the above 94.1 wt % hydrocarbons were composed of 66.6 wt % xylene, 25.0 wt % aromatic hydrocarbons other than xylene, and 2.5 wt % hydrocarbons other than aromatic hydrocarbons. Also, the above 5.9 wt % oxygen-containing organic compounds were composed of 4.8 wt % oxygen-containing compounds of aromatic compounds and 1.1 wt % oxygen-containing compounds other than aromatic compounds.

Meanwhile, the aqueous phase was composed of 1.7 wt % organic compounds and 98.3 wt % water.

Comparative Example 1

Without provision of any liquefied fuel oil dehydration reactor downstream of the biomass liquefaction reactor, only biomass liquefaction was performed under conditions similar to those in Example 1.

As a result, the weight of a water-insoluble liquefied fuel oil recovered after biomass liquefaction was 390 g (80.2 wt %), the weight of the aqueous phase was 74 g (15.2 wt %), and the weight of loss (including unreacted solids, gas products, and the like) was 22 g (4.5 wt %).

The components of the water-insoluble liquefied fuel oil and the aqueous phase were analyzed using a gas-chromatograph mass spectrometer (Shimadzu Corporation, GCMS-QP5000). The water-insoluble liquefied fuel oil was composed of 76.8 wt % hydrocarbons and 23.2 wt % oxygen-containing organic compounds. Therefore, the yield of hydrocarbons was 300 g (=390 g×76.8%). The reaction solvent, xylene, was converted to an oxygen-containing compound, so that no high-heat-value hydrocarbon liquefied fuel oil could be obtained from biomass in total balance. In addition, the above 76.8 wt % hydrocarbons were composed of 68.5 wt % xylene, 3.8 wt % aromatic hydrocarbons other than xylene, and 4.5 wt % hydrocarbons other than aromatic hydrocarbons. Also, the above 23.2 wt % oxygen-containing organic compounds were composed of 11.8 wt % oxygen-containing compounds of aromatic compounds and 11.4 wt % oxygen-containing compounds other than aromatic compounds.

Meanwhile, the aqueous phase was composed of 3.3 wt % organic compounds and 96.7 wt % water.

Example 2

A mixture (464 g) of 390 g of a water-insoluble liquefied fuel oil and 74 g of an aqueous phase obtained by a method similar to that in Comparative example 1 was allowed to pass at 100 g/h for 4.7 hours through a liquefied fuel oil dehydration reactor charged with 50 g of a zeolite catalyst H/ZSM-5 (Si/Al=45) while maintaining the reactor temperature at 300° C. and pressure at 5 MPaG. After dehydration, 386 g (83.2 wt %) of a water-insoluble liquefied fuel oil, 77 g (16.6 wt %) of an aqueous phase, and 1 g (0.2 wt %) of gaseous substances were obtained.

The components of the thus obtained water-insoluble liquefied fuel oil and aqueous phase were analyzed using a gas-chromatograph mass spectrometer (Shimadzu Corporation, GCMS-QP5000). The water-insoluble liquefied fuel oil was composed of 96.6 wt % hydrocarbons and 3.4 wt % oxygen-containing organic compounds. Therefore, 373 g (=386 g×96.6%) of hydrocarbons was generated, indicating that 13 g (36 wt %) out of 36 g of the solid biomass content could be converted to a hydrocarbon liquefied fuel oil. In addition, the above 96.6 wt % hydrocarbons were composed of 61.2 wt % xylene, 31.5 wt % aromatic hydrocarbons other than xylene, and 3.9 wt % hydrocarbons other than aromatic hydrocarbons. Also, the above 3.4 wt % oxygen-containing organic compounds were composed of 1.9 wt % oxygen-containing compounds of aromatic compounds and 1.5 wt % oxygen-containing compounds other than aromatic compounds.

Meanwhile, the aqueous phase was composed of 1.1 wt % organic compounds and 98.9 wt % water.

Example 3

A mixture (464 g) of 390 g of a water-insoluble liquefied fuel oil and 74 g of an aqueous phase obtained by a method similar to that in Comparative example 1 was allowed to pass at 40 g/h for 11.6 hours through a liquefied fuel oil hydrogenation reactor charged with 20 g of a $Pd/Al_2O_3$ catalyst while maintaining the reactor temperature at 300° C. and the pressure at 9 MPaG. At this time, hydrogen was fed at 50 NL/h to the liquefied fuel oil hydrogenation reactor. After hydrogenation, 390 g (84.1 wt %) of a water-insoluble liquefied fuel oil, 72 g (15.5 wt %) of an aqueous phase, and 2 g (0.4 wt %) of gaseous substances were obtained.

The components of the thus obtained water-insoluble liquefied fuel oil and aqueous phase were analyzed using a gas-chromatograph mass spectrometer (Shimadzu Corporation, GCMS-QP5000). The water-insoluble liquefied fuel oil was composed of 97.4 wt % hydrocarbons and 2.6 wt % oxygen-containing organic compounds. Therefore, 380 g (=390 g×97.4%) of hydrocarbons was generated, indicating that 20 g (56 wt %) out of 36 g of the solid biomass content could be converted to a hydrocarbon liquefied fuel oil. In addition, the above 97.4 wt % hydrocarbons were composed of 0.0 wt % xylene, 0.0 wt % aromatic hydrocarbons other than xylene, and 97.4 wt % hydrocarbons (having cyclohexane skeletons) other than aromatic hydrocarbons. Also, the above 2.6 wt % oxygen-containing organic compounds were composed of 0.0 wt % oxygen-containing compounds of aromatic compounds and 2.6 wt % oxygen-containing compounds other than aromatic compounds.

Meanwhile, the aqueous phase was composed of 1.0 wt % organic compounds and 99.0 wt % water.

Example 4

Oak wood was ground with a cutter mill and then dried. Subsequently, the dried product was passed through a 16-mesh sieve and then a powder (particle size: 1 mm or less) that did not pass through a 32-mesh sieve was prepared. This oak powder was further dried with a dryer and then adjusted to have a moisture percentage of about 15 wt %. A biomass liquefaction reactor was charged with 42 g (with a solid biomass content of 36 g) of the oak powder (as a biomass feedstock) adjusted to have the aforementioned particle size and moisture percentage.

While xylene (Nakalai Tesque, a special grade reagent) for use as a solvent for liquefaction was transferred at a flow rate of 276 g/h via a high-pressure pump and water was transferred at a flow rate of 78 g/h via another high-pressure pump, the solvent comprising xylene and water was heated by a solvent heater to 300° C. Thereafter the solvent was allowed to pass through the above biomass liquefaction reactor for 1 hour in order to perform biomass liquefaction. The reaction pressure during liquefaction was adjusted to 12 MPaG. Since the liquefaction time was 1 hour in this case, the amount of xylene fed to the biomass was 276 g and the sum of moisture contained in the biomass and water fed to the same was 84 g (=6+78 g). The moisture percentage, including the moisture contained in the biomass in the solvent, was 23.3 wt % (=84 g/(84 g+276 g)×100). Also, the total amount of the solvent caused to pass through the biomass was 10 times the solid biomass content in terms of ratio by weight (=360 g/36 g=10).

The amount of the biomass that had reacted accounted for 91 wt %, as determined by subtracting the solid biomass content remaining in the biomass liquefaction reactor after liquefaction from the charged solid biomass content. Therefore, the liquefied fuel conversion percentage was 84 wt %, as determined using the ratio of the amount of the biomass contained in the xylene phase to the charged solid biomass content.

A liquefied fuel oil (300 g) from which solids and an aqueous phase after liquefaction had been separated was allowed to pass at 20 g/h for 15 hours through a liquefied fuel oil dehydration reactor charged with 10 g of a zeolite catalyst H/ZSM-5 (Si/Al=45) while maintaining the reactor temperature at 300° C. and pressure at 5 MPaG. After dehydration, 294 g (98 wt %) of a water-insoluble liquefied fuel oil, 3 g (1 wt %) of an aqueous phase component, and 3 g (1 wt %) of gaseous substances were obtained.

The components of the thus obtained water-insoluble liquefied fuel oil were analyzed using a gas-chromatograph mass spectrometer (Shimadzu Corporation, GCMS-QP5000). The water-insoluble liquefied fuel oil was composed of 99 wt % hydrocarbons and 62 wt % xylene that had been used as a solvent remained. Specifically, the loss to gaseous substances accounted for as low as 1 wt %. Therefore, xylene used as a solvent could be caused to remain accounting for 62 wt %. Also, the thus obtained water-insoluble liquefied fuel oil mainly contained substituted C6-C10 alkyl benzenes (xylene, ethylbenzene, toluene, etc.), and it also contained small amounts of aliphatic hydrocarbons.

Comparative Example 2

Procedures similar to those in Example 4 were performed, except that ordinary pressure was employed as operational pressure for dehydration of a liquefied fuel oil.

As a result, when 300 g of the liquefied fuel oil was fed, 273 g (91 wt %) of a water-insoluble liquefied fuel oil, 3 g (1 wt %) of an aqueous phase component, and 24 g (8 wt %) of gaseous substances were obtained.

The components of the thus obtained water-insoluble liquefied fuel oil were analyzed using a gas-chromatograph mass spectrometer (Shimadzu Corporation, GCMS-QP5000). The water-insoluble liquefied fuel oil was composed of 99 wt % hydrocarbons, and 49 wt % xylene that had been used as a solvent remained. Specifically, the loss to gaseous substances accounted for as high as 8 wt % and 51 wt % xylene that had been used as a solvent deteriorated.

Comparative Example 3

In this Comparative example, procedures similar to those in Example 4 were performed, except that hydrogenation (as described below) was performed instead of dehydration.

A liquefied fuel oil (300 g) obtained by a method similar to that in Example 4 was allowed to pass at 20 g/h for 15 hours through a liquefied fuel oil hydrogenation reactor charged with 10 g of a Pd/Al$_2$O$_3$ catalyst while maintaining the reactor temperature at 300° C. and pressure at 9 MPaG. At this time, hydrogen was fed to the liquefied fuel oil hydrogenation reactor at 24 NL/h. After hydrogenation, 285 g (95 wt %) of a water-insoluble liquefied fuel oil, 3 g (1 wt %) of an aqueous phase component, and 12 g (4 wt %) of gaseous substances were obtained.

The components of the thus obtained water-insoluble liquefied fuel oil were analyzed with a gas-chromatograph mass spectrometer (Shimadzu Corporation, GCMS-QP5000). The water-insoluble liquefied fuel oil was composed of 99 wt % hydrocarbons. Moreover, xylene used as a solvent was completely hydrogenated and none thereof remained.

Comparative Example 4

A biomass liquefaction reactor was charged with 35 g of an oak powder (solid biomass content: 30 g) as a biomass feedstock that had been prepared by a method similar to that in Example 4.

Subsequently, while 1-butanol (Nakalai Tesque, a special grade reagent) for use as a solvent for liquefaction was transferred at a flow rate of 300 g/h via a high-pressure pump and water was transferred at a flow rate of 70 g/h via another high-pressure pump, the solvent comprising 1-butanol and water was heated by a solvent heater to 300° C. Thereafter the solvent was allowed to pass through the above biomass liquefaction reactor for 1 hour in order to perform biomass liquefaction. The reaction pressure during liquefaction was adjusted to 12 MPaG. Since the liquefaction time was 1 hour in this case, the amount of 1-butanol fed to the biomass was 300 g and the sum of the moisture contained in the biomass and water fed to the same was 75 g (=5+70 g). The percentage of moisture including the moisture contained in the biomass in the solvent was 20 wt % (=75 g/(75 g+300 g)×100). Also, the total amount of the solvent caused to pass through the biomass was 12.5 times the solid biomass content in terms of ratio by weight (375 g/30 g=12.5).

The amount of the biomass that had reacted accounted for 99 wt %, as determined by subtracting the solid biomass content remaining in the biomass liquefaction reactor after liquefaction from the charged solid biomass content. Therefore, the liquefied fuel conversion percentage was 96 wt %, as determined using the ratio of the amount of the biomass contained in the 1-butanol phase to the charged solid biomass content.

Subsequently, 300 g of a liquefied fuel oil from which solids and an aqueous phase after liquefaction had been separated was caused to pass at 20 g/h for 15 hours through a liquefied fuel oil dehydration reactor charged with 10 g of a zeolite catalyst H/ZSM-5 (Si/Al=45) while maintaining the reactor temperature at 350° C. and pressure at 10 MPaG. After dehydration, 117 g (39 wt %) of a water-insoluble liquefied fuel oil, 144 g (48 wt %) of an aqueous phase component, and 39 g (13 wt %) of gaseous substances were obtained.

The components of the thus obtained water-insoluble liquefied fuel oil were analyzed with a gas-chromatograph mass spectrometer (Shimadzu Corporation, GCMS-QP5000). It contained almost no 1-butanol used as a solvent.

INDUSTRIAL APPLICABILITY

The water-insoluble liquefied fuel oil obtained by the method according to the present invention can be utilized as a fuel oil for automobiles or motorbikes, or as a fuel oil for boilers and power generators. Moreover, since the obtained water-insoluble liquefied fuel oil is derived from biomass, it has a zero carbon dioxide emission count and thus is capable of contributing to solve global environmental problems such as global warming.

DESCRIPTION OF SYMBOLS 1, 38: Solvent storage tank
2, 39: Solvent
3, 40: Solvent transfer line
4, 41: Solvent transfer pump
5, 42: Solvent heater
6, 43: Biomass liquefaction reactor
7, 44: Biomass
8, 45: Heating device of biomass liquefaction reactor
9: Liquefied fuel mixture transfer line
10, 47: Gas/liquid separation tank
11, 48: Gas product
12: Liquefied fuel mixture
13, 50: Gas product transfer line
14, 51: Gas product withdrawal valve
15: Liquefied fuel mixture transfer line
16: Liquefied fuel mixture withdrawal valve
17: Liquefied fuel mixture reservoir
18: Liquefied fuel mixture
19: Liquefied fuel mixture transfer line
20: Liquefied fuel mixture transfer pump
21: Liquefied fuel mixture heater
22: Dehydration catalyst or hydrogenation catalyst
23: Liquefied fuel mixture dehydration reactor or liquefied fuel mixture hydrogenation reactor
24, 64: Perforated plate
25: Heating device of liquefied fuel mixture dehydration reactor or liquefied fuel mixture hydrogenation reactor
26: Water-insoluble liquefied fuel oil·aqueous phase transfer line
27, 67: Gas/liquid separation tank
28, 68: Gas product
29: Water-insoluble liquefied fuel oil·aqueous phase
30, 70: Gas product transfer line
31, 71: Gas product withdrawal valve
32: Water-insoluble liquefied fuel oil·aqueous phase transfer line
33: Water-insoluble liquefied fuel oil·aqueous phase withdrawal valve
34: Recovery device for organic solvent
35, 75: Solvent recovery line
36, 76: Water-insoluble liquefied fuel oil transfer line
37, 77: Aqueous phase recovery line
46: Liquefied fuel oil transfer line
49: Liquefied fuel oil
52: Liquefied fuel oil transfer line
53: Liquefied fuel oil withdrawal valve
54: Oil-water separation reservoir of liquefied fuel oil
55: Liquefied fuel oil (oil phase)
56: Aqueous phase containing water-soluble organic substance
57: Aqueous phase withdrawal valve
58: Aqueous phase transfer line
59: Liquefied fuel oil transfer line
60: Liquefied fuel oil transfer pump
61: Liquefied fuel oil heater
62: Dehydration catalyst
63: Liquefied fuel oil dehydration reactor
65: Heating device of liquefied fuel oil dehydration reactor
66: Water-insoluble liquefied fuel oil transfer line
69: Water-insoluble liquefied fuel oil
72: Water-insoluble liquefied fuel oil transfer line
73: Water-insoluble liquefied fuel oil withdrawal valve
74: Recovery device for aromatic hydrocarbon solvent All publications, patents, and patent applications cited herein are incorporated herein by reference in their entirety.

What is claimed is:

1. A method for producing a water-insoluble liquefied fuel oil containing a hydrocarbon, comprising the steps of: subjecting a mixture that contains biomass containing lignocellulose, an organic solvent, and water to liquefaction; simultaneously with or after liquefaction, causing a mixture of the liquefied fuel oil that contains the organic solvent and an aqueous phase that contains a water-soluble organic substance to come into contact with a dehydration catalyst under pressure and then subjecting the resultant to dehydration, or causing the mixture of a liquefied fuel oil that contains the organic solvent and an aqueous phase that contains a water-soluble organic substance to come into contact with hydrogen in the presence of a hydrogenation catalyst under pressure, and then subjecting the resultant to hydrogenation; and separating a water-insoluble liquefied fuel oil from the mixture after dehydration or hydrogenation, wherein the dehydration catalyst or hydrogenation catalyst is a zeolite catalyst or a $Pd/Al_2O_3$ catalyst.

2. A method for producing a water-insoluble liquefied fuel oil, comprising the steps of: subjecting a mixture that contains biomass containing lignocellulose, an aromatic hydrocarbon solvent, and water to liquefaction; causing the liquefied fuel oil that contains the aromatic hydrocarbon solvent after liquefaction to come into contact with a dehydration catalyst under pressure and then subjecting the resultant to dehydration; and separating a water-insoluble liquefied fuel oil from the mixture after dehydration, wherein the dehydration catalyst is a zeolite catalyst or a $Pd/Al_2O_3$ catalyst.

3. The method according to claim 1, wherein the liquefaction is performed at a temperature between 250° C. and 370° C.

4. The method according to claim 2, wherein the liquefaction is performed at a temperature between 250° C. and 370° C.

5. The method according to claim 1, wherein the dehydration or hydrogenation is performed at a temperature between 250° C. and 400° C.

6. The method according to claim 2, wherein the dehydration is performed at a temperature between 250° C. and 400° C.

7. The method according to claim 1, wherein the dehydration or hydrogenation is performed under a pressure of between 1 MPaG and 20 MPaG.

8. The method according to claim 2, wherein the dehydration is performed under a pressure of between 1 MPaG and 20 MPaG.

9. The method according to claim 1, wherein the aqueous phase containing a water-soluble organic substance separated after dehydration or hydrogenation is reused as some or all of the water to be used for liquefaction.

10. The method according to claim 2, wherein the aqueous phase containing a water-soluble organic substance separated after liquefaction and/or dehydration is reused as some or all of the water to be used for liquefaction.

11. The method according to claim 1, wherein the organic solvent separated from the mixture after dehydration or hydrogenation is reused as some or all of the organic solvent for liquefaction.

12. The method according to claim 2, wherein the aromatic hydrocarbon solvent separated from the mixture after dehydration is reused as some or all of the aromatic hydrocarbon solvent for liquefaction.

13. The method according to claim 1, wherein the organic solvent is an aromatic hydrocarbon having 6 to 12 carbon atoms.

14. The method according to claim 2, wherein the aromatic hydrocarbon is xylene.

15. The method according to claim 13, wherein the aromatic hydrocarbon is xylene.

* * * * *